United States Patent Office 3,285,556
Patented Nov. 15, 1966

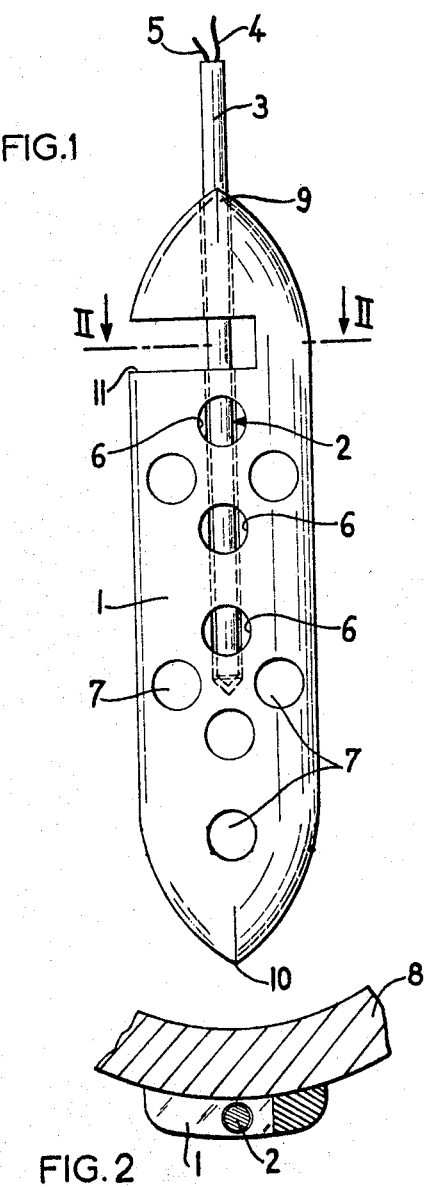

3,285,556
DEVICE FOR ATTACHING A THERMOCOUPLE PROBE TO A WALL
Robert Le Polles, Cormeilles-en-Parisis, and Robert Schley, Orly, France, assignors to Commissariat a l'Energie Atomique, Paris, France
Filed Apr. 13, 1966, Ser. No. 542,306
Claims priority, application France, Apr. 30, 1965, 15,444
5 Claims. (Cl. 248—205)

This invention relates to a device for the purpose of attaching a thermocouple probe to a metallic wall and especially to the can of a nuclear fuel element, the surface temperature of which is to be measured when said fuel element is placed within a reactor channel during operation.

With this object in view, the invention is directed to a device which affords high mechanical strength and which is capable of offering resistance under particular design conditions to the stresses which act on the bond formed between the thermocouple probe and the fuel can and which mainly arise from the gas flow which usually serves to cool the fuel element. Furthermore, the device referred to has a relatively very small volume and consequently gives rise to practically no perturbation of the thermal and aerodynamic conditions prevailing in the contact zone in which the temperature measurement is being taken. Finally, the said device has high temperature resistance, thereby preventing in particular the destruction of the bond formed between the thermocouple probe and the fuel can, even in the evvent of violent thermal shocks.

A further object of the invention is to provide a device which makes it possible to obtain excellent thermal contact between the probe and the metallic wall or can of the fuel element, the temperature measurement taken by the probe being highly punctual. Finally, this invention permits a mode of attachment which does not embrittle the probe at the point of contact of this latter with the wall.

Accordingly, said device is characterized in that it comprises a metallic terminal connector in which is formed a substantially axial blind-end bore for the purpose of positioning the thermocouple probe therein with slight play, said terminal connector being provided with a first series of holes which terminate at right angles in said bore and a second series of holes which traverse the terminal connector outside said bore, both series of holes being intended to permit the introduction of a brazing compound for forming a bond on the one hand between the probe and the terminal connector and on the other hand between said terminal connector and the metallic wall.

Preferably, the terminal connector is formed of a metal which depends on the metal employed for the metallic wall and on the metallurgical possibilities of forming a bond by brazing between these two elements. Moreover, the width of the terminal connector is chosen so that the diameter of the axial bore which is pierced therein is slightly larger than that of the thermocouple probe while leaving on each side of said bore as small a thickness of material as possible. The width of the terminal connector is also determined so that the holes which are formed therein are capable of containing a sufficient quantity of brazing compound to permit effective attachment of the connector to the metallic wall and of the probe to the connector.

In accordance with yet another characteristic design feature, the profile of the terminal connector is defined by that of the metallic wall in order that excellent thermal contact may thus be ensured, the ends of the terminal connector being also given a bow-shaped profile in order to facilitate the flow of coolant gas, especially in the case which is more specifically contemplated in which the metallic wall referred to is that a nuclear fuel element can.

Finally, the terminal connector is advantageously provided with a transverse recess which traverses the bore of the thermocouple probe and which is intended to receive a sufficient quantity of anti-wetting product to prevent the propagation of the brazing compound over the probe sheath beyond said recess and thus to prevent the embrittlement of said sheath.

All the characteristic features outlined above will be explained in greater detail in the following description of one example of construction which is given by way of indication and not in any limiting sense.

In the accompanying drawings:

FIG. 1 is a view in elevation of the terminal connector employed for the attachment of a thermocouple, as designed in accordance with the invention;

FIG. 2 is a sectional view of FIG. 1 taken along the line II—II.

From these figures, it is apparent that the device under consideration is essentially composed of a terminal connector 1, within which is pierced substantially along the axis thereof a blind-end bore 2 having a diameter which is sufficient to permit the insertion of the sheath 3 of a thermocouple probe, the leads 4 and 5 of which are shown diagrammatically in the figure. A first series of radial holes 6 is provided in the terminal connector, said holes having their openings in the bore 2 in order that they can be filled with a powdered brazing compound which is intended to fill up completely the small space which is formed inside the bore 2 between this latter and the sheath 3 of the probe. Provision is also made for a second series of holes such as 7 which, in this case, are through-holes and accordingly traverse the entire width of the terminal connector so that the powdered brazing compound with which said through-holes are filled is permitted to reach all the points of the contact surface between the terminal connector 1 and a wall 8 against which said connector is to be applied, as shown in FIG. 2. Under these conditions, the brazing of the sheath 3, terminal connector and wall can be performed in a single operation in a vacuum furnace which is heated to a suitable temperature, once the assembly of the different parts mentioned above has been completed.

As appears from FIG. 1, the ends 9 and 10 of the terminal connector 1 are preferably bow-shaped with a view to facilitating the coolant gas flow in contact with the metallic wall 8, especially in the case in which said wall is a nuclear fuel element can. Finally, the terminal connector 1 is provided with a transverse recess or cavity 11 which serves to permit the introduction of a sufficient quantity of anti-wetting product, thereby preventing the propagation of the brazing compound over the sheath 3 beyond said recess.

As will be understood, this invention is not limited to the form of embodiment described and illustrated which has been given solely by way of example. In particular, it can be noted that, in this example, the holes 6 do not have openings in contact with the wall 8 against which the terminal connector 1 is applied, such an arrangement being essentially provided when the material forming the probe sheath 3 is incompatible from a metallurgical standpoint with the material which forms the metallic wall 8. In other alternative forms, it would be possible to extend the holes up to the wall, which would further improve the attachment of the terminal connector to said wall.

What we claim is:

1. Device for attaching a thermocouple probe to a metallic wall, characterized in that it comprises a metallic terminal connector in which is formed a substantially axial blind-end bore for the purpose of positioning the thermocouple probe therein with slight play, said terminal connector being provided with a first series of holes which terminate at right angles in said bore and a second series of holes which traverse said terminal connector outside said bore, both series of holes being intended to permit the introduction of a brazing compound for forming a bond on the one hand between the probe and the terminal connector and on the other hand between said terminal connector and the metallic wall.

2. Device in accordance with claim 1, characterized in that the terminal connector is formed of a metal which depends on the metal employed for the metallic wall and on the metallurgical possibilities of forming a bond by brazing between these two elements.

3. Device in accordance with claim 1, characterized in that the profile of the terminal connector is defined by that of the metallic wall in order that excellent thermal contact with said wall may thus be ensured.

4. Device in accordance with claim 1, characterized in that the ends of the terminal connector have bow-shaped profiles.

5. Device in accordance with claim 1, characterized in that the terminal connector is provided with a transverse recess which traverses the bore of the thermocouple probe and which is filled with an anti-wetting product.

References Cited by the Examiner

FOREIGN PATENTS 1,295,050  4/1962  France.

CLAUDE A. LE ROY, *Primary Examiner.*